United States Patent
Hicks et al.

(10) Patent No.: US 11,036,624 B2
(45) Date of Patent: Jun. 15, 2021

(54) SELF HEALING SOFTWARE UTILIZING REGRESSION TEST FINGERPRINTS

(71) Applicant: INTERNATIONAL BUSINESS MACHINES CORPORATION, Armonk, NY (US)

(72) Inventors: Andrew Hicks, Wappingers Falls, NY (US); Dale E. Blue, Poughkeepsie, NY (US); Ryan Thomas Rawlins, New Paltz, NY (US); Rachel Brill, Haifa (IL); Deborah A. Furman, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

(21) Appl. No.: 16/440,833

(22) Filed: Jun. 13, 2019

(65) Prior Publication Data
US 2020/0394129 A1 Dec. 17, 2020

(51) Int. Cl.
*G06F 11/36* (2006.01)
(52) U.S. Cl.
CPC ...... *G06F 11/3688* (2013.01); *G06F 11/3676* (2013.01); *G06F 11/3684* (2013.01)
(58) Field of Classification Search
CPC ............. G06F 11/3688; G06F 11/3676; G06F 11/3684
USPC .................................................. 717/124–139
See application file for complete search history.

(56) References Cited

U.S. PATENT DOCUMENTS

| | | |
|---|---|---|
| 5,153,881 A | 10/1992 | Bruckert |
| 5,185,877 A | 2/1993 | Bissett |
| 6,859,922 B1 * | 2/2005 | Baker ................. G06F 11/3414 |
| | | 705/51 |

(Continued)

FOREIGN PATENT DOCUMENTS

| | | |
|---|---|---|
| WO | 2016138953 A1 | 9/2016 |
| WO | 2018162048 A1 | 9/2018 |

OTHER PUBLICATIONS

Willmor, David, and Suzanne M. Embury. "A safe regression test selection technique for database-driven applications." 21st IEEE International Conference on Software Maintenance (ICSM'05). IEEE, 2005.pp. 1-10 (Year: 2005).*

(Continued)

*Primary Examiner* — Satish Rampuria
(74) *Attorney, Agent, or Firm* — Cantor Colburn LLP; Teddi Maranzano

(57) ABSTRACT

A method for automatically avoiding fault paths in software code of a System Under Test (SUT) includes generating a plurality of fingerprints by executing a plurality of regression tests. Each of the plurality of fingerprints uniquely identifies a specific code path in the software code of the SUT. A critical error is detected during execution of the software code of the SUT. A fault code path in the software code of the SUT associated with the critical error is identified by analyzing the plurality of generated fingerprints. At least one fingerprint associated with the fault code path in the software code of the SUT is identified. During subsequent execution of the software code of the SUT, the identified fault code path in the software code of the SUT is automatically prevented from being executed based on the identified at least one fingerprint.

14 Claims, 9 Drawing Sheets

(56) References Cited

U.S. PATENT DOCUMENTS

| | | | |
|---|---|---|---|
| 7,178,063 B1 | 2/2007 | Smith | |
| 7,552,425 B2 | 6/2009 | Bates et al. | |
| 7,596,778 B2* | 9/2009 | Kolawa | G06F 11/3688 |
| | | | 717/126 |
| 7,617,074 B2 | 11/2009 | Beish | |
| 7,640,470 B2 | 12/2009 | Lammel | |
| 7,945,898 B1 | 5/2011 | Episkopos et al. | |
| 7,962,798 B2 | 6/2011 | Locasto | |
| 8,296,605 B2 | 10/2012 | John | |
| 8,370,816 B2 | 2/2013 | Farchi et al. | |
| 8,479,171 B2 | 7/2013 | Ghosh | |
| 8,527,813 B2 | 9/2013 | Budnik | |
| 8,649,995 B2 | 2/2014 | Thulasidasan et al. | |
| 8,756,460 B2 | 6/2014 | Blue et al. | |
| 8,775,886 B2 | 7/2014 | Mellen | |
| 8,954,926 B2 | 2/2015 | Braun et al. | |
| 8,954,930 B2 | 2/2015 | Kamenz | |
| 8,997,061 B1 | 3/2015 | Davison | |
| 9,098,635 B2 | 8/2015 | Peri-Glass et al. | |
| 9,111,033 B2 | 8/2015 | Bates | |
| 9,202,005 B2 | 12/2015 | Goswami et al. | |
| 9,286,313 B1 | 3/2016 | Sharangpani | |
| 9,336,122 B2 | 5/2016 | Kilzer et al. | |
| 9,454,466 B2 | 9/2016 | Ivrii et al. | |
| 9,489,289 B2 | 11/2016 | Hu | |
| 9,513,998 B2 | 12/2016 | Coronado | |
| 9,529,701 B2 | 12/2016 | Ekambaram et al. | |
| 9,720,766 B2 | 8/2017 | Lee | |
| 9,734,263 B2 | 8/2017 | Kohavi et al. | |
| 9,779,013 B2 | 10/2017 | Narayan et al. | |
| 9,857,959 B2 | 1/2018 | Dhawal | |
| 9,916,414 B2 | 3/2018 | Jeong | |
| 9,996,452 B2 | 6/2018 | Cooper et al. | |
| 10,061,685 B1 | 8/2018 | White | |
| 10,073,763 B1 | 9/2018 | Raman | |
| 2004/0154001 A1 | 8/2004 | Haghighat et al. | |
| 2008/0065931 A1* | 3/2008 | Coulter, Jr. | G06F 11/261 |
| | | | 714/37 |
| 2008/0163165 A1* | 7/2008 | Shitrit | G06F 11/3688 |
| | | | 717/107 |
| 2008/0172652 A1 | 7/2008 | Davia et al. | |
| 2009/0249123 A1* | 10/2009 | Chow | G01R 31/318364 |
| | | | 714/37 |
| 2010/0023928 A1 | 1/2010 | Hentschel et al. | |
| 2010/0287534 A1 | 11/2010 | Vangala et al. | |
| 2011/0016457 A1 | 1/2011 | Artzi et al. | |
| 2011/0145653 A1 | 6/2011 | Broadfoot | |
| 2013/0152047 A1 | 6/2013 | Moorthi | |
| 2014/0013307 A1* | 1/2014 | Hansson | G06F 11/3688 |
| | | | 717/124 |
| 2014/0059081 A1 | 2/2014 | Farchi et al. | |
| 2014/0372083 A1 | 12/2014 | Hsu et al. | |
| 2015/0094997 A1 | 4/2015 | Ivrii et al. | |
| 2015/0106653 A1 | 4/2015 | Adler et al. | |
| 2016/0378618 A1 | 12/2016 | Cmielowski et al. | |
| 2017/0060734 A1 | 3/2017 | Raz et al. | |
| 2017/0103013 A1 | 4/2017 | Grechanik | |
| 2017/0132119 A1 | 5/2017 | Xu et al. | |
| 2017/0270035 A1 | 9/2017 | Nie | |
| 2018/0024911 A1 | 1/2018 | Kruszewski et al. | |
| 2018/0095867 A1 | 4/2018 | Varadarajan et al. | |
| 2018/0293156 A1 | 10/2018 | Zeng | |

OTHER PUBLICATIONS

Yi, Qiuping, et al. "A synergistic analysis method for explaining failed regression tests." 2015 IEEE/ACM 37th IEEE International Conference on Software Engineering. vol. 1. IEEE, 2015.pp. 257-267 (Year: 2015).*

Orso, Alessandro, Nanjuan Shi, and Mary Jean Harrold. "Scaling regression testing to large software systems." ACM SIGSOFT Software Engineering Notes 29.6 (2004): pp. 241-251. (Year: 2004).*

Rothermel, Gregg, et al. "Prioritizing test cases for regression testing." IEEE Transactions on software engineering 27.10 (2001): pp. 929-948. (Year: 2001).*

Memon, Atif M., and Qing Xie. "Studying the fault-detection effectiveness of GUI test cases for rapidly evolving software." IEEE transactions on software engineering 31.10 (2005): pp. 884-896. (Year: 2005).*

Taneja, Kunal, et al. "eXpress: guided path exploration for efficient regression test generation." Proceedings of the 2011 International Symposium on Software Testing and Analysis. 2011.pp. 1-11 (Year: 2011).*

Anonymous, "A Method and System for Providing Collaborative Platform as a Service for Aiding Machine Learning Development," IP.com (IPCOM000256095D). Nov. 2, 2018. 5 pages.

Anonymous, "Black Hole Testing—Machine Learning Program Behavior Patterns from Massive Automated Test Results," IP.com (IPCOM000243987D). Nov. 4, 2015. 8 pages.

Anonymously Disclosed "A system and method for setting breakpoints automatically by comparing correct and incorrect runs" IP.com No. IPCOM000252399D, Publication Date: Jan. 8, 2018, 5 pages.

Anonymously Disclosed "Advanced Interrogative Debugger for data-centric domain", IP.com No. IPCOM000226865D, Publication Date: Apr. 23, 2013, 14 pages.

Anonymously Disclosed "Cognitive, Self-Instrumenting Code on Detection of an Issue" IP.com No. IPCOM000253277D; Publication Date: Mar. 19, 2018; 4 pgs.

Anonymously Disclosed "Method and system to find potential program defect based on run-time variable change analysis", IP.com No. IPCOM000248699D, Publication Date: Dec. 28, 2016, 8 pages.

Anonymously Disclosed "Method for a debugging tool for finding variable value in application stack", IP.com No. IPCOM000209789D, Publication Date: Aug. 15, 2011, 5 pages.

Anonymously Disclosed "Method to enable debugger breakpoint inside statement", IP.com No. IPCOM000206941D, Publication Date: May 13, 2011, 8 pages.

Anonymously Disclosed "Simple Automated Code Coverage Method for test metrics", IP.com No. IPCOM000201864D, Publication Date: Nov. 29, 2010, 6 pages.

Anonymously Disclosed "Structured enhanced breakpoint chain", IP.com No. IPCOM000244264D, Publication Date: Nov. 27, 2015, 4 pages.

Anonymously Disclosed "System and method for improved regression failure analysis and easier debugging of test failures", IP.com No. IPCOM000209599D, Publication Date: Aug. 10, 2011, 6 pages.

Astigarraga, Tara "IBM Test Overview and Best Practices", IBM, Nov. 2012, pp. 1-53.

Cohen, D. M. et al., "The AETG system: An approach to testing based on combinatorial design." IEEE Transactions on Software Engineering, 23(7), pp. 437-444. Jul. 1997.

Compuware Corporation "Validate Testing Thoroughness and Provide Application Analysis", 2014, 4 pages.

De Souza et al., "Spectrum-based Software Fault Localization: A Survey of Techniques, Advances and Challenges" Dept. of Computer Science—University of Sao Paulo; arXiv:1607.04347v2 [cs.SE]; Nov. 26, 2017, 46 pages.

Devai, Gergely et al., "UML Model Execution via Code Generation" Eotvos Lorand University, Faculty of Informatics, Budapest, Hungary 2017, pp. 9-15.

Hicks et al., "Champion Test Case Generation", U.S. Appl. No. 16/256,949, filed Jan. 24, 2019.

Hicks et al., "Combinatoric Set Completion Through Unique Test Case Generation", U.S. Appl. No. 16/256,394, filed Jan. 24, 2019.

Hicks et al., "Fault Detection and Localization Using Combinatorial Test Design Techniques While Adhering to Archtiectural", U.S. Appl. No. 16/256,391, filed Jan. 24, 2019.

Hicks et al., "Reduction of Test Infrastructure", U.S. Appl. No. 16/440,781, filed Jun. 13, 2019.

Hicks et al., "Fault Detection and Localization to Generate Failing Test Cases Using Combinatorial Test Design Techniques", U.S. Appl. No. 16/256,388, filed Jan. 24, 2019.

Hicks et al., "Test Space Analysis Across Multiple Combinatoric Models", U.S. Appl. No. 16/256,388, filed Jan. 24, 2019.

(56) References Cited

OTHER PUBLICATIONS

Hicks et al., "Associating Attribute Seeds of Regression Test Cases With Breakpoint Value-Based Fingerprints," U.S. Appl. No. 16/440,857, filed Jun. 13, 2019.
Hicks et al., "Breakpoint Value-Based Version Control," U.S. Appl. No. 16/440,800, filed Jun. 13, 2019.
Hicks et al., "Customizable Test Set Selection Using Code Flow Trees," U.S. Appl. No. 16/440,751, filed Jun. 13, 2019.
Hicks et al., "Fault Detection Using Breakpoint Value-Based Fingerprints of Failing Regression Test Cases," U.S. Appl. No. 16/440,810, filed Jun. 13, 2019.
Hicks et al., "Regression Test Fingerprints Based on Breakpoint Values," U.S. Appl. No. 16/440,404, filed Jun. 13, 2019.
IBM "Assuring Software Quality by Automatic Generation of Test Cases and Automatic Analysis of Test Case Results for Derivation and Regression Error Determination" IP.com No. IPCOM000180300D; Publication Date: Mar. 6, 2009; 6 pgs.
IBM, "InspectioN Testing Using Debugging Capabilities to Allow Combinational Testing", IP.com No. IPCOM000188370D, Electronic Publication Date: Oct. 2, 2009, 3 pages.
IBM, "Tool and Strategy for testing and validating software components at the source code level", IP.com No. IPCOM000180330D, Publication Date: Mar. 6, 2009, 3 pages.
IBM, Method of preventing build failures by searching through levels in a multi-level revision control system IP.com No. IPCOM000179779D, Publication Date: Feb. 25, 2009, 3 pages.
Koch, Gernot et al., "Breakpoints and Breakpoint Detection in Source Level Emulation", Forschungszentrum Informatik (FZI), Haid-und-Neu-Strabe 10-14, D 76131 Karlsruhe, DE; University of Tübingen, Sand 13, D 72076 Tübingen, DE, 2017, 6 pages.
Kuhn, Rick "Introduction to Combinatorial Testing", NIST, Carnegie-Mellon University, Jun. 7, 2011, 48 pages.
Leon et al., "An empirical evaluation of test case filtering techniques based on exercising complex information flows," Proceedings of the 27th International Conference on Software Engineering, pp. 412-421. ACM, 2005.
Kamalakar, Sunil, "Automatically Generating Tests from Natural Language Descriptions of Software Behavior," Virginia Polytechic Institute and State University, Sep. 23, 2013. 72 pages.
List of IBM Patents or Patent Applications Treated as Related; Date Filed: Jul. 19, 2019, 2 pages.
Mathur et al., "Adaptive Automation: Leveraging Machine Learning to Support Uninterrupted Automated Testing of Software Applications" arXiv.org, Aug. 4, 2015. 6 pages.
Nguyen et al., "Combining model-based and combinatorial testing for effective test case generation," Proceedings of the 2012 International Symposium on Software Testing and Analysis, Jul. 15-20, 2012. pp. 100-110.
Petke, J. et al., "Efficiency and early fault detection with lower and higher strength combinatorial interaction testing". In Proceedings of the 2013 9th Joint Meeting on Foundations of Software Engineering, pp. 26-36. Aug. 18-26, 2013.
Segall "Combinatorial Test Design" IBM Haifa Research Labs, 2012, pp. 1-49.
Shakya, K. & Xie, T., "Isolating Failure-Inducing Combinations in Combinatorial Testing using Test Augmentation and Classification", CT 2012 workshop, (23 pages).
Soffa, Mary Lou et al. Exploiting Hardware Advances for Software Testing and Debugging (NIER Track) ICSE '11; May 21-28, 2011; 4 pgs.
Yilmaz et al., "Moving forward with combinatorial interaction testing," Computer, 47(2). Feb. 2014. pp. 37-45.

\* cited by examiner

SELF HEALING SOFTWARE UTILIZING REGRESSION TEST FINGERPRINTS

RELATED APPLICATIONS

This application which claims the benefits of multiple legally related applications including application titled "FAULT DETECTION AND LOCALIZATION TO GENERATE FAILING TEST CASES USING COMBINATORIAL TEST DESIGN TECHNIQUES" assigned Ser. No. 16/256,388, filed Jan. 24, 2019; application titled "FAULT DETECTION AND LOCALIZATION USING COMBINATORIAL TEST DESIGN TECHNIQUES WHILE ADHERING TO ARCHITECTURAL RESTRICTIONS" assigned Ser. No. 16/256,391, filed Jan. 24, 2019; application titled "COMBINATORIC SET COMPLETION THROUGH UNIQUE TEST CASE GENERATION" assigned Ser. No. 16/256,394, filed Jan. 24, 2019; application titled "TEST SPACE ANALYSIS ACROSS MULTIPLE COMBINATORIC MODELS" assigned Ser. No. 16/256,179, filed Jan. 24, 2019; application titled "CHAMPION TESTCASE GENERATION" assigned Ser. No. 16/256,949, filed Jan. 24, 2019; application titled "REGRESSION TEST FINGERPRINTS BASED ON BREAKPOINT VALUES,", assigned Ser. No. 16/440,404, filed Jun. 13, 2019; application titled "CUSTOMIZABLE TEST SET SELECTION USING CODE FLOW TREES," Ser. No. 16/440,751; application titled "REDUCTION OF TEST INFRASTRUCTURE," Ser. No. 16/440,781; application titled "BREAKPOINT VALUE-BASED VERSION CONTROL," Ser. No. 16/440,800; application titled "FAULT DETECTION USING BREAKPOINT VALUE-BASED FINGERPRINTS OF FAILING REGRESSION TEST CASES," Ser. No. 16/440,810; and application titled "ASSOCIATING ATTRIBUTE SEEDS OF REGRESSION TEST CASES WITH BREAKPOINT VALUE-BASED FINGERPRINTS," not yet filed, with all the benefits accruing therefrom, the contents of which in its entirety are herein incorporated by reference.

BACKGROUND

The present invention relates generally to regression testing, and more particularly, to self-healing software that fences off problematic code paths by utilizing fingerprints that identify code paths and/or lines of code traversed by regression tests.

Breakpoints are intentional stopping or pausing points in a program, typically inserted for the purposes of debugging. More generally, a breakpoint is a means of acquiring knowledge about a program's execution. When a breakpoint is reached during execution, a test environment (e.g., general purpose registers, memory, logs, files, etc.) may be inspected or recorded to attempt to determine whether the program is functioning as expected. Breakpoints are commonly used to interrupt a running program immediately before execution of a particular program instructions, in which case, they may be referred to as instruction breakpoints.

When an error associated with a particular code path is discovered while executing regression tests, any subsequent execution of the same code path will result in an error until the troubleshooting and/or code repair is completed. At least in some cases, such error may represent a critical problem that brings the entire system down. It is desirable to detect and avoid any code path associated with such critical problems until fixed code is deployed.

SUMMARY

In one or more example embodiments, a method for automatically avoiding fault paths in software code of a System Under Test (SUT) is disclosed. The method includes generating a plurality of fingerprints by executing a plurality of regression tests. The plurality of regression tests is generated based on a functional coverage model of the SUT. Each of the plurality of fingerprints uniquely identifies a specific code path in the software code of the SUT. When a critical error is detected during execution of the software code of the SUT, a fault code path in the software code of the SUT associated with the critical error is identified by analyzing the plurality of generated fingerprints. At least one fingerprint associated with the fault code path in the software code of the SUT is identified. During subsequent execution of the software code of the SUT, the identified fault code path in the software code of the SUT is automatically prevented from being executed based on the identified at least one fingerprint.

In one or more other example embodiments, a system for automatically avoiding fault paths in software code of a System Under Test (SUT) is disclosed. The system includes at least one memory storing computer-executable instructions and at least one processor configured to access the at least one memory and execute the computer-executable instructions to perform a set of operations. The operations include generating a plurality of fingerprints by executing a plurality of regression tests. The plurality of regression tests is generated based on a functional coverage model of the SUT. Each of the plurality of fingerprints uniquely identifies a specific code path in the software code of the SUT. When a critical error is detected during execution of the software code of the SUT, a fault code path in the software code of the SUT associated with the critical error is identified by analyzing the plurality of generated fingerprints. At least one fingerprint associated with the fault code path in the software code of the SUT is identified. During subsequent execution of the software code of the SUT, the identified fault code path in the software code of the SUT is automatically prevented from being executed based on the identified at least one fingerprint.

In one or more other example embodiments, a computer program product for automatically avoiding fault paths in software code of a System Under Test (SUT) is disclosed. The computer program product includes a computer readable storage medium having program instructions embodied therewith. The program instructions are executable by a processing circuit to cause the processing circuit to perform a method. The method includes generating a plurality of fingerprints by executing a plurality of regression tests. The plurality of regression tests is generated based on a functional coverage model of the SUT. Each of the plurality of fingerprints uniquely identifies a specific code path in the software code of the SUT. When a critical error is detected during execution of the software code of the SUT, a fault code path in the software code of the SUT associated with the critical error is identified by analyzing the plurality of generated fingerprints. At least one fingerprint associated with the fault code path in the software code of the SUT is identified. During subsequent execution of the software code of the SUT, the identified fault code path in the software code of the SUT is automatically prevented from being executed based on the identified at least one fingerprint.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
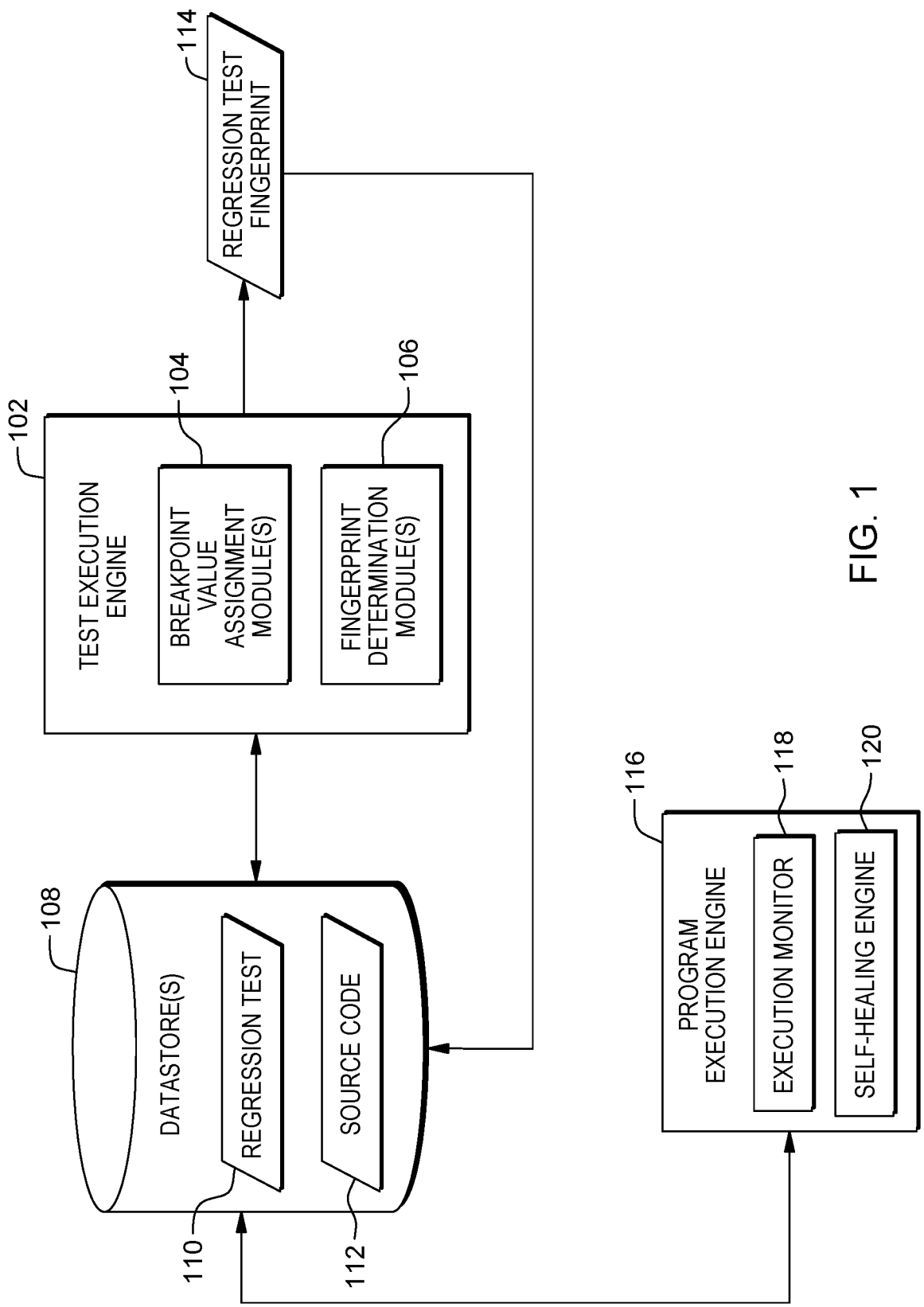
FIG. 1 is a schematic hybrid data flow/block diagram illustrating generation of fingerprints for a plurality of regression tests and utilization of generated fingerprints to avoid a fault code path in accordance with one or more example embodiments of the invention.

Example embodiments of the invention relate to, among other things, devices, systems, methods, computer-readable media, techniques, and methodologies for automatically fencing off a fault code path based on generated fingerprints of a regression test that identify code paths traversed by the regression test and/or specific lines of codes encountered during execution of the regression test. The regression test may be executed on a System Under Test (SUT). Self-healing automatic avoidance of a fault code path may take place during execution of a program on the SUT. While example embodiments may be described herein with respect to regression testing and execution of a software system such as a body of source code, it should be appreciated that the SUT may be a hardware system or a software system.

As part of the software development process, source code coverage techniques are becoming increasingly more valuable in the pursuit of higher-quality software products. One such technique involves the use of breakpoints, which are points in the execution of source code that occur before or after one or more lines of source code and that can halt execution of the program or trigger specific tools. Conventional breakpoint usage relies on a manual process of marking interesting lines of source code that encapsulate a set of commonly used functions and routines such as, for example, procedure entries and exits.

This conventional process for using breakpoints, however, suffers from a number of technical drawbacks including the inability to recover the specific code paths taken to drive a given set of routines. For instance, conventional breakpoint usage provides no indication of the number of times any given breakpoint is encountered during execution of a regression test or the order in which the breakpoints are encountered. As used herein, a code path may refer to a path traversed during execution of at least a portion of source code and may indicate a number of times each breakpoint is encountered and/or an order in which such breakpoints are encountered during execution. This lack of granularity with conventional breakpoint usage makes complete code coverage during quality testing very unlikely, leading to weaker regression test buckets and increasing the likelihood that defects remain in a final product.

Example embodiments of the invention address the above-described technical problems associated with conventional breakpoint usage by providing various mechanisms for assigning breakpoint values to breakpoints such that a fingerprint can be generated for a regression test that contains information that is mutable and reversible to enable an identification of at least which breakpoints are encountered during execution of the regression test and a number of times each such breakpoint is encountered. In addition, certain mechanisms disclosed herein provide a regression test fingerprint that uniquely identifies a code path traversed during execution of a regression test. That is, certain example embodiments relate to breakpoint value assignment algorithms that generate a unique regression test fingerprint that contains information from which the code path taken by the regression test can be reconstructed including which breakpoints are encountered during execution of the regression test, a number of times each such breakpoint is encountered, and an order in which breakpoints are encountered.

When an execution of a regression test discovers an error in the code under test, any future execution of the same faulty code path typically would lead to the same error until the bug in the code that caused the error is fixed in the code by code developers. It should be noted that if the discovered error is so severe that it will bring the entire SUT down, such critical failure may be happening every single time whether the faulty code is executed by a regression test or in the actual production environment. In embodiments, systems and methods involve automatically keeping the system usable by preventing the execution of the fault code path. In some embodiments, a user is notified (actively or passively) when the system detects a critical error. The user may provide instructions identifying an alternative code path. The alternative code path is executed instead of the fault code path. In some cases, the user may manually configure one or more steps to avoid critical problems identified by the execution of a plurality of regression tests. Thus, example embodiments of the invention relate to breakpoint value assignment algorithms that provide the technical effect of generating regression test fingerprints from which alternative code paths can be taken during execution of the program in the production environment. This technical effect represents a technical solution over conventional breakpoint usage which does not allow for dynamic redirection of code paths taken to avoid critical errors. This technical effect constitutes an improvement to computer technology because it enables systems to stay operational (despite critical errors in the code) based on analysis of generated fingerprints. More specifically, example embodiments of the invention enable resources, such as time and processor cycles, to be more effectively utilized to run systems that may contain weak points by preventing critical system crashes that would require a restart of all processes.

Illustrative methods in accordance with example embodiments of the invention and corresponding data structures (e.g., program modules) for performing the methods will now be described. It should be noted that each operation of the method 400 and 500 depicted in FIG. 4 and FIG. 5, respectively, may be performed by one or more of the program modules or the like depicted in FIG. 1 or FIG. 6, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 4:
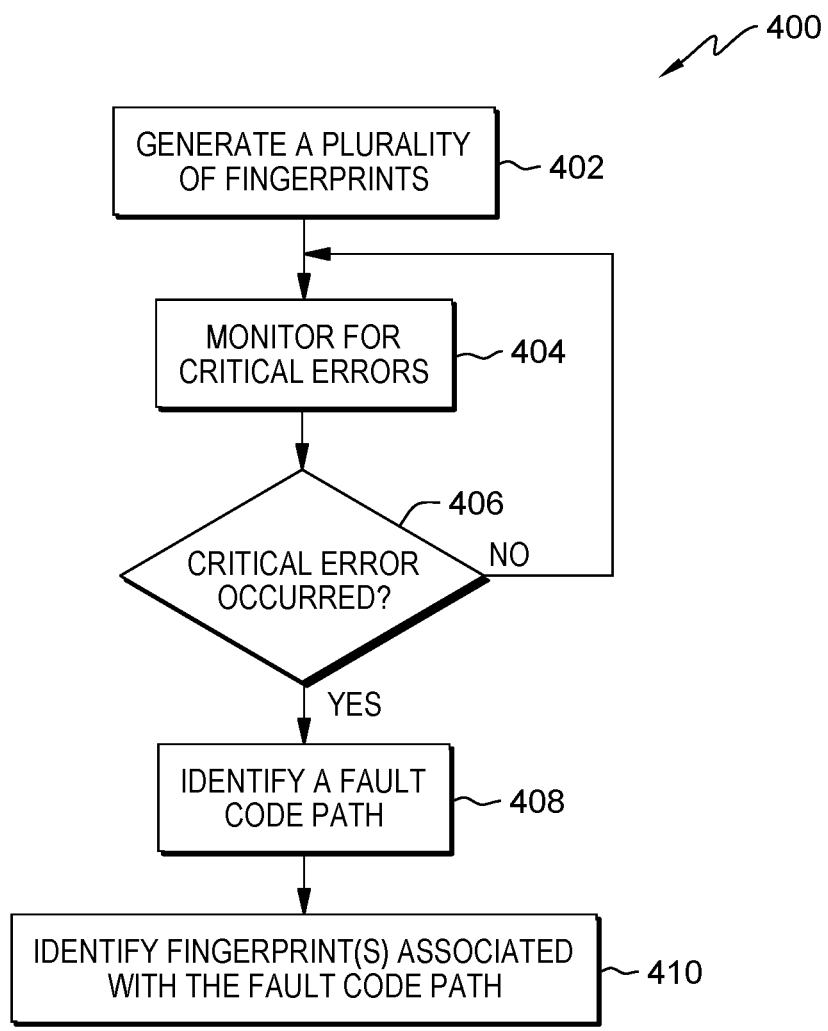
FIG. 4 is a process flow diagram of an illustrative method for identifying a fault code path based on a fingerprint generation algorithm in accordance with one or more example embodiments of the invention.
Figure 5:
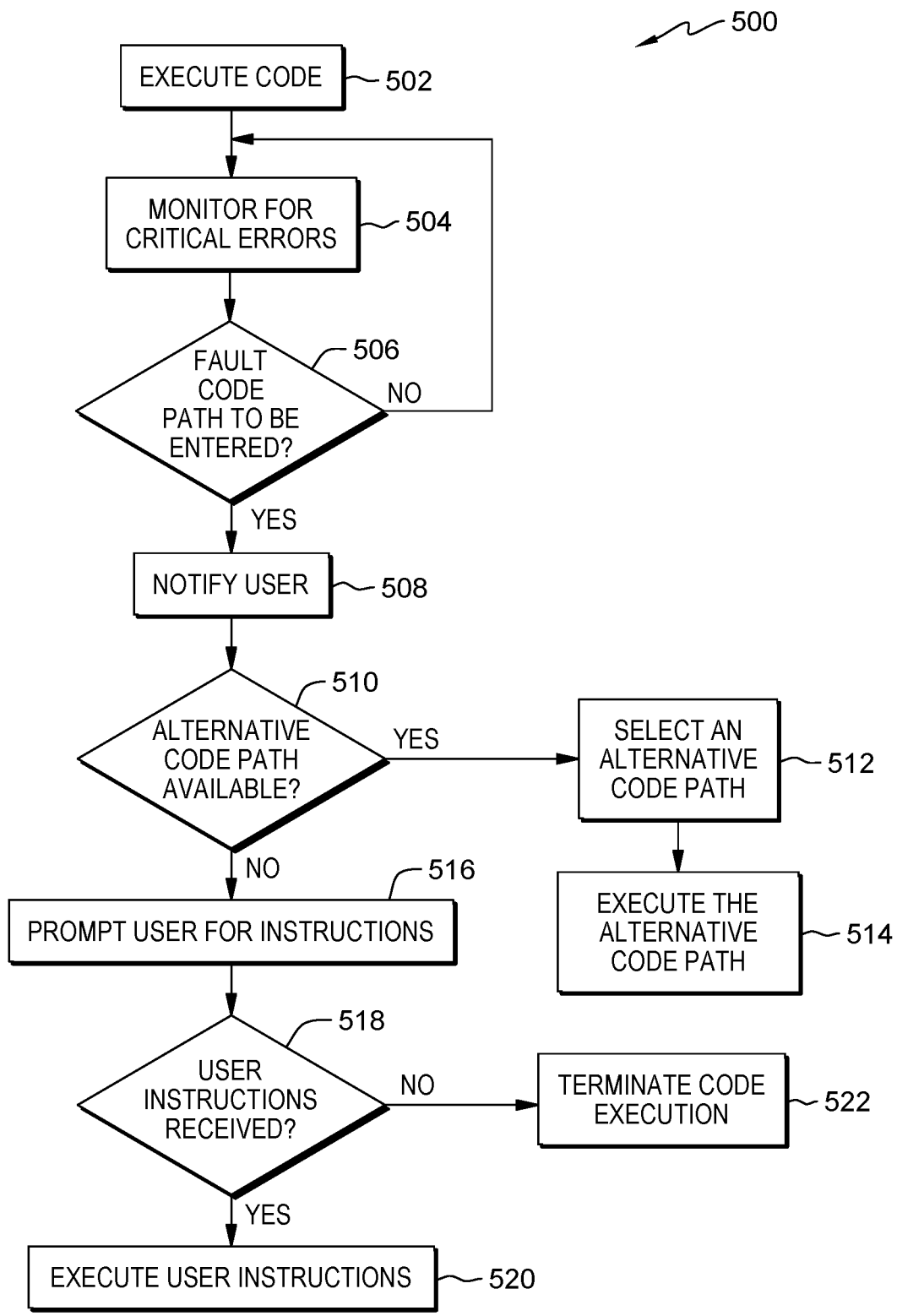
FIG. 5 is a process flow diagram of an illustrative method for automatically fencing off fault code paths during program execution in a production environment in accordance with one or more example embodiments of the invention.

FIG. 1 is a schematic hybrid data flow/block diagram illustrating generation of a fingerprint for a regression test in accordance with one or more example embodiments of the invention. FIG. 4 is a process flow diagram of an illustrative method for identifying a fault code path based on a fingerprint generation algorithm in accordance with one or more example embodiments of the invention. FIG. 5 is a process flow diagram of an illustrative method for automatically fencing off fault code paths during program execution in a production environment in accordance with one or more example embodiments of the invention. FIG. 4 and FIG. 5 will be described in conjunction with FIG. 1 hereinafter.

Starting with FIG. 4, at block 402 of the method 400, a test execution engine 102 may generate a plurality of fingerprints. To generate the fingerprints, the test execution engine 102 may first identify a regression test 110 to run on a SUT. The test execution engine 102 may retrieve the regression test 110 from one or more datastores 108. In example embodiments, the regression test 110 may be executed on source code 112, which may also be retrieved from the datastore(s) 108. In example embodiments, inputs to the source code 112 to be tested may be modeled as a collection of attribute-value pairs. As such, in certain example embodiments, the regression test 110 may be a test case designed to test the operation of the source code 112 with respect to a particular combination of attribute values. The regression test 110 may be generated based on a functional coverage model of the SUT. The functional coverage model defines a triplet: functional attributes, a domain for each functional attribute, and a set of restrictions. The functional attributes may be any attribute of the SUT. The domains may define for each attribute a set of possible values. The cross-product of the different combinations of the attributes defines a functional coverage test-space. The test-space comprises a set of coverage tasks, each representing functional requirements to be tested: one requirement per functional attribute and the requirement is that the functional attribute will exhibit the behavior of the value of the coverage task. The coverage task may be seen as a tuple of one value per attribute. In a functional coverage model in which there are three functional attributes, one having three possible values, the second having two possible values, and the third having ten possible values, the cross-product test-space comprises sixty (60) coverage tasks. The functional coverage model defines possible combinations of values of the attributes as covered by the plurality of regression tests.

In addition, at block 402 of the method 400, computer-executable instructions of one or more breakpoint value assignment modules 104 may be executed to assign breakpoint values to breakpoints associated with the SUT. For instance, in example embodiments, computer-executable instructions of the breakpoint value assignment module(s) 104 may be executed to assign a respective value to each of one or more breakpoints inserted into the source code 112. After breakpoint values are assigned, the test execution engine 102 may execute the regression test 110 on the SUT. For instance, the test execution engine 102 may execute the regression test 110 on the source code 112. A plurality of fingerprints may be generated as a result of the execution of the regression test 110 on the SUT. This step may be repeated for a plurality of regression tests 110 to generate a plurality of fingerprints 114 for each of the regression tests. Each of the plurality of generated fingerprints uniquely identifies a specific code path in the software code of the SUT.

Software errors in large systems are often due to non-deterministic events, and as a result, such errors are transient. For example, a particular process starting from a first state may encounter a nondeterministic event which results in an error. If that process is rolled back to the first state, it may not encounter the nondeterministic event, or the nondeterministic event may behave in a different way, and therefore the error may not occur (i.e. the error is bypassed). For example, such nondeterminism may be present with respect to messages coming from different communications channels. Such messages may arrive in different orders during different execution of the same process. According to an embodiment of the present invention, as computer-executable instructions associated with the source code 112 start executing, an execution monitor 118 starts monitoring the execution (block 404) to determine if any critical errors have occurred. Some critical errors may be serious enough to bring down the entire SUT.

If the execution monitor 118 detects any critical errors (decision block 406, "Yes" branch), a self-healing engine 120 identifies a fault code path associated with the detected critical error at block 408. In one embodiment, the self-healing engine 120 may perform analysis to identify a particular code path (fault code path) executed by a corresponding regression test that resulted in the critical error. The sequence in which statements are performed often depends on particular values associated with particular variables. As part of this analysis, the self-healing engine 120 may determine under what specific circumstances program control flows through the fault code path. In one embodiment, the self-healing engine 120 may determine the last decision branch that was taken to drive the fault code path. Such a decision branch may be associated with a particular breakpoint, as discussed below.

At block 410 of the method 400, the self-healing engine 120 may communicate with one or more fingerprint determination modules 106 to determine which breakpoints are encountered during execution of the fault code path and the number of times each such breakpoint is encountered as well as, potentially, an order in which the breakpoints are encountered. In addition, at block 410, computer-executable instructions of the fingerprint determination module(s) 106 may be executed to determine the fingerprint 114 for the fault code path based at least in part on the identified fault execution code path and the assigned breakpoint values.

Referring now to FIG. 5, assuming that the SUT has been released and the source code 112 has been deployed in a production environment without fixing all known critical errors, at block 502, the program execution engine 116 starts executing computer-executable instructions associated with the source code 112 in a production environment where it can be accessed by users. In an alternative embodiment, the program execution engine 116 may start executing the computer-executable instructions in a pre-production environment. The pre-production environment is a synchronized Software Development Environment (SDE) configured to mimic the configuration of the production environment. This can include host connectivity, firewall or security configuration or additional server setup. This is an optional environment that not all projects need, but that can be used to increase the level of confidence in testing. The synchronized SDE may be directly connected to a Business Development Environment (BDE), for example, allowing the ability to publish code and content that has been assembled by a user into an environment that can be used for various types of testing, i.e., UAT, OAT, etc.

According to an embodiment of the present invention, as computer-executable instructions associated with the source code 112 start executing in the production environment, the execution monitor 118 starts monitoring the execution (block 504) to determine if any known fault code path is about to be entered. In one embodiment, the execution monitor 118 determines that based on the sequence in which statements are performed. As noted above, the sequence in which statements are performed often depends on particular values associated with particular variables. As part of this analysis performed at block 406, the self-healing engine 120 may determine under what specific circumstances program control flows through the fault code path. For instance, if the regression test results in a failure result associated with a fault code path, the corresponding fault code path (including potentially the order in which breakpoints are encountered) can be discerned from the fingerprint. In one embodiment, the execution monitor 118 determines whether a known fault code path is about to be entered based on the evaluated values of variables associated with the fault code path. If the execution monitor 118 determines that current code path will not lead to critical errors (decision block 506, "No" branch), the execution monitor 118 continues to monitor execution of the computer-executable instructions associated with the source code 112.

According to an embodiment of the present invention, in response to determining that a fault code path is about to be entered (decision block 506, "Yes" branch), the execution monitor 118 may notify a user by any feasible means (block 508). As one non-limiting example, the execution monitor 118 may initiate an alert notification to a particular user or group of users and may provide data (e.g. fingerprint data) indicative of the breakpoint leading to a fault path execution. The execution monitor 118 may also send this data to the self-healing engine 120. In response to receiving data associated with a particular fault code path, at block 510, the self-healing engine 120 may automatically determine if one or more alternative code path(s) are available. This analysis may be performed based on the fingerprint data associated with a plurality of regression tests, for example. Alternative paths are illustrated in FIGS. 3B-3D.

In response to determining that one or more alternative code paths are available, at block 512, the self-healing engine 112 may select one of the alternative code paths. In one embodiment, as discussed below, the self-healing engine 112 may find a minimum set of values for a fingerprint and code flow condition so that if this set of values is set then the critical error doesn't occur. The alternative code path may be selected based on an analysis of the results of the executed plurality of regression tests. Once the alternative code path is selected, at block 514, the self-healing engine 112 may instruct the program execution engine 116 to execute the alternative code path which would avoid the occurrence of a known critical error.

In one embodiment, in response to not finding an alternative code path (decision block 510, "No" branch), at block 516, the self-healing engine 112 may send a request for user's feedback. In one embodiment, user's feedback may indicate instructions/alternative course of actions with respect to averting the detected fault code path. In this embodiment, at block 518, the self-healing engine 112 determines if any user instructions are received. If the corresponding user instructions are received (decision block 518, "Yes" branch), at block 520, the self-healing engine 112 executes provided instructions. The provided instructions may include but are not limited to an alternative code path not found by the self-healing engine 112.

Finally, in response to determining that no instructions have been received from a user (decision block 518, "No" branch), at block 522 of the method 500, the self-healing engine 112 may terminate execution of the computer-executable instructions associated with the source code 112 if no alternative solution is found. This graceful termination may still enable the system to save all the data and could be a better option, as compared to an abrupt termination as a result of the critical error 312.

Figure 2:
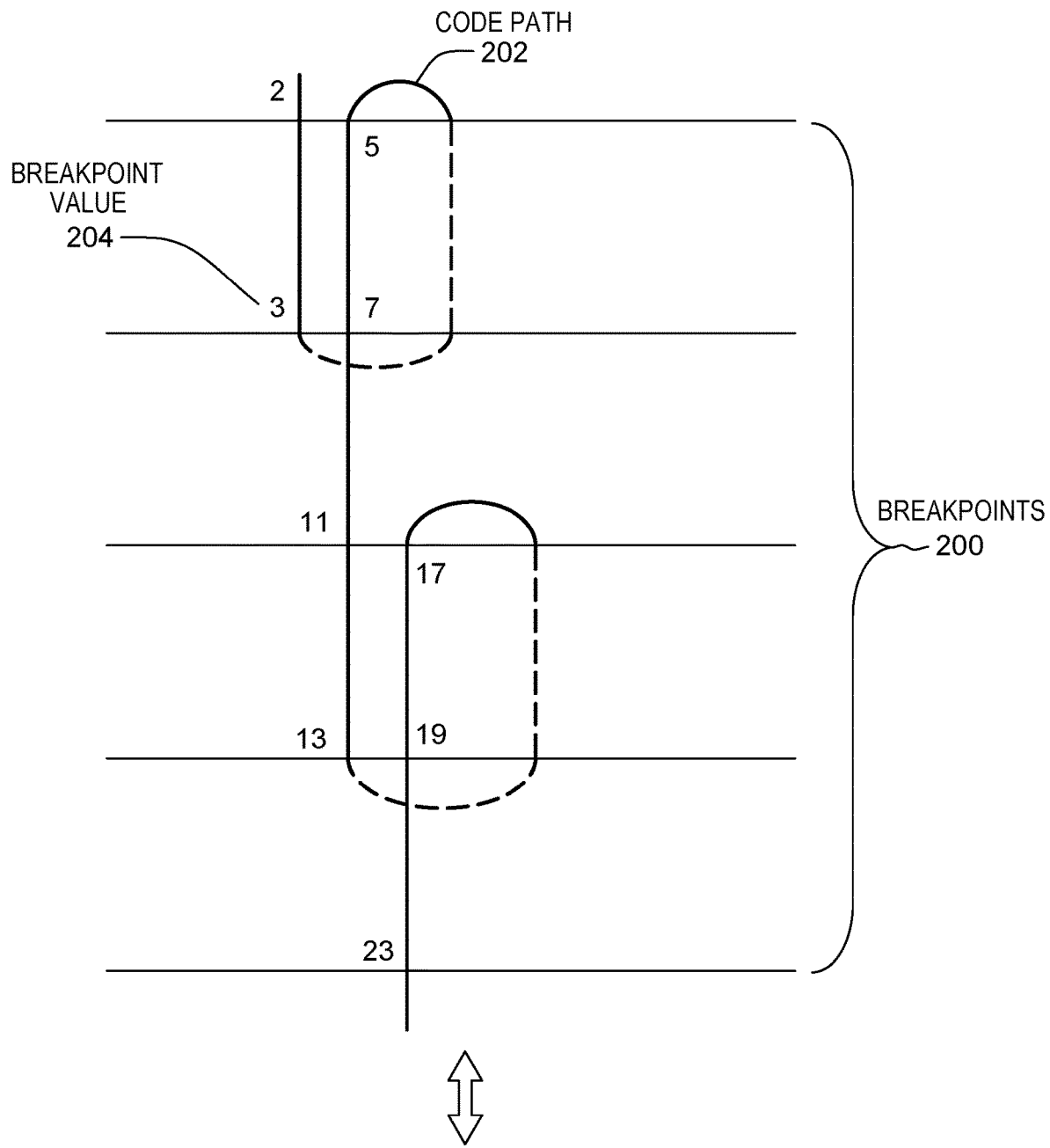
FIG. 2 depicts example code paths taken during regression testing and corresponding fingerprints generated in accordance with a prime number-based fingerprint generation algorithm in accordance with one or more example embodiments of the invention.

Various breakpoint value assignment/fingerprint generation algorithms are described herein. FIG. 2, for example, depicts a prime number-based fingerprint generation algorithm in connection with two different code paths corresponding to execution of different regression tests. A set of example breakpoints 200 are depicted in FIG. 2. The breakpoints 200 may be at least a subset of the breakpoints contained in the source code 112. In example embodiments, execution of the regression test 110 may cause a code path 202 to be traversed. In accordance with the prime number-based breakpoint value assignment/fingerprint generation algorithm according to example embodiments of the invention, prime number values 204 may be consecutively assigned to breakpoints as they are encountered during execution of the regression test 110. In example embodiments, the prime numbers may be reserved in advance and assigned to breakpoints as needed. In other example embodiments, each next consecutive prime number may be dynamically calculated and assigned as a next breakpoint is encountered during execution of the regression test 110.

For instance, as depicted in FIG. 2, a first breakpoint encountered during execution of the regression test 110 may be assigned the prime number value 2 and a second breakpoint encountered may be assigned the next consecutive prime number value of 3. As shown in FIG. 2, the code path 202 then returns to the first breakpoint, which is assigned the next consecutive prime number value of 5, followed by the second breakpoint again, which is assigned the next prime number value 7. The code path 202 then traverses a third breakpoint, which is assigned the prime number value 11, and a fourth breakpoint, which is assigned the prime number value 13. The code path returns to the third breakpoint, which is assigned the prime number value 17, followed by the fourth breakpoint again, which is assigned the prime number value 19. Finally, the code path 202 traverses a fifth breakpoint, which is assigned the prime number value 23.

It should be appreciated that a respective prime number value is assigned to each encounter of a breakpoint during execution of the regression test 110. In example embodiments, each breakpoint 200 may be identified by a corresponding identifier, which in turn, may be stored in association with each breakpoint value 204 that is assigned to the breakpoint during traversal of the code path 202. For instance, the breakpoint values 2 and 5 may be stored in association with an identifier of the first breakpoint; the values 3 and 7 may be stored in association with an identifier of the second breakpoint; the values 11 and 17 may be stored in association with an identifier of the third breakpoint; the values 13 and 19 may be stored in association with an identifier of the fourth breakpoint; and the value 23 may be stored in association with an identifier of the fifth breakpoint. It should further be appreciated the code path 202 (and any illustrative code path depicted and described herein) is merely exemplary and that a code path may traverse any number of breakpoints any number of times.

In example embodiments that utilize the prime number-based breakpoint value assignment/fingerprint generation algorithm, the fingerprint determination module(s) 106 may generate the fingerprint 114 based on the prime number values assigned to the breakpoint encounters. More specifically, the fingerprint determination module(s) 106 may aggregate, for each breakpoint encountered at least once during traversal of the code path 202, the breakpoint values (e.g., the prime number values) assigned to the encounters of that breakpoint. An indexed data structure (e.g., an array, a vector, etc.) may then be populated with these aggregate values. The indexed data structure may represent the fingerprint 114. In example embodiments, aggregating the breakpoint values may involve multiplying the values assigned to each breakpoint together to obtain the aggregate/composite value corresponding to each breakpoint. In other example embodiments, aggregating the breakpoint values may involve summing the values assigned to each breakpoint together to obtain the aggregate/composite value corresponding to each breakpoint.

For instance, referring again to the specific code path 202 depicted in FIG. 2, the breakpoint values 2 and 5 assigned to the encounters with the first breakpoint during traversal of the code path 202 may be multiplied to obtain the value 10. Similarly, the breakpoint values 3 and 7 assigned to the encounters with the second breakpoint may be multiplied to obtain the value 21; the breakpoint values 11 and 17 assigned to the encounters with the third breakpoint may be multiplied to obtain the value 187; and the breakpoint values 13 and 19 assigned to the encounters with the fourth breakpoint may be multiplied to obtain the value 247. An indexed data structure is then populated with these aggregate values. Since only one breakpoint value (23) is assigned to the fifth breakpoint because the fifth breakpoint is encountered only once in the example code path 202, no aggregation is needed, and the indexed data structure is additionally populated with the single prime number value of 23.

In the above-described manner, the indexed data structure <10, 21, 187, 247, 23> may represent the fingerprint 114 for an example regression test 110 that traverses the example code path 202. In example embodiments, the data structure <10, 21, 187, 247, 23> may be indexed with respect to those breakpoints that are encountered during traversal of the code path 202. In particular, in example embodiments, the first value in the example fingerprint 114 given by <10, 21, 187, 247, 23> (e.g., the value 10) may be linked to the first breakpoint encountered during traversal of the code path 202; the second value 21 may be linked to the second breakpoint encountered; and so on. In example embodiments, the fingerprint 114 may only include values for breakpoints that are encountered during traversal of a code path. For instance, the example fingerprint 114 given by <10, 21, 187, 247, 23> only includes values corresponding to breakpoints that are encountered during traversal of the code path 202, which may not be consecutive breakpoints within the source code 112. For instance, the first through fifth breakpoints described in reference to FIG. 2 may actually correspond to non-consecutive breakpoints among all breakpoints present in the source code 112. In other example embodiments, all breakpoints present in the source code 112 may be indexed in the fingerprint 114, with those breakpoints not encountered during traversal of the code path 202, and thus, not assigned a breakpoint number value having a corresponding zero value in the fingerprint 114.

In example embodiments, the fingerprint 114 given by <10, 21, 187, 247, 23> that is generated for the example code path 202 using the prime number-based breakpoint value assignment/fingerprint generation algorithm is reversible to reconstruct the code path 202. In particular, the fingerprint <10, 21, 187, 247, 23> can be used to determine which breakpoints are encountered during execution of the regression test case 110, the number of encounters for each such breakpoint, and the order in which the breakpoint encounters occur. More specifically, a prime factorization of each of the values in the fingerprint <10, 21, 187, 247, 23> can be performed to reconstruct the code path 202. The order in which the breakpoints are encountered is discernible because the algorithm assigned the prime number to the breakpoint encounters in a consecutive manner.

For instance, the first value in the fingerprint <10, 21, 187, 247, 23> can be broken down into its prime factors 2 and 5. Similarly, the second value in the fingerprint can be broken down into its prime factors 3 and 7; the third value prime factorizes to 11 and 17; the fourth value to 13 and 19; and the fifth value is itself a prime number, and thus, already in reduced form. Because the prime numbers are consecutively assigned during execution of the regression test 110, the code path 202—including the order in which breakpoint encounters occur—can be exactly reconstructed. That is, it can be discerned that the first and third encounters (represented by the prime numbers 2 and 5, respectively) involve the first breakpoint; the second and fourth encounters (represented by the prime numbers 3 and 7, respectively) involve the second breakpoint; the fifth and seventh encounters (represented by the prime numbers 11 and 17, respectively) involve the third breakpoint; the sixth and eighth encounters (represented by the prime numbers 13 and 19, respectively) involve the fourth breakpoint; and the ninth encounter (represented by the prime number 23) involves the fifth breakpoint. As such, the following order of breakpoint encounters that occur during traversal of the code path 202 can be discerned from the fingerprint <10, 21, 187, 247, 23>: Breakpoint 1->Breakpoint 2->Breakpoint 1->Breakpoint 2->Breakpoint 3->Breakpoint 4->Breakpoint 3->Breakpoint 4->Breakpoint 5. In those example embodiments in which the values in the fingerprint represent the summation (rather than multiplication) of prime number values, each value may also be broken down into its constituent prime number values, which can then be used to ascertain the traversal order of the code path 202.

In example embodiments, the prime number-based breakpoint value assignment/fingerprint generation algorithm generates a fingerprint 114 that uniquely identifies the code path traversed during execution of a corresponding regression test 110. More specifically, the prime number-based breakpoint value assignment/fingerprint generation algorithm generates a fingerprint 114 that identifies not only the breakpoints encountered during traversal of a code path and the number of times each such breakpoint is encountered, but also the order in which the encounters occur. Thus, if execution of two different regression tests results in code paths that encounter the same breakpoints the same number of times but in different orders, the respective fingerprint generated for each regression test will uniquely identify the particular order in which breakpoint encounters occur for that regression test.

Figure 3A:
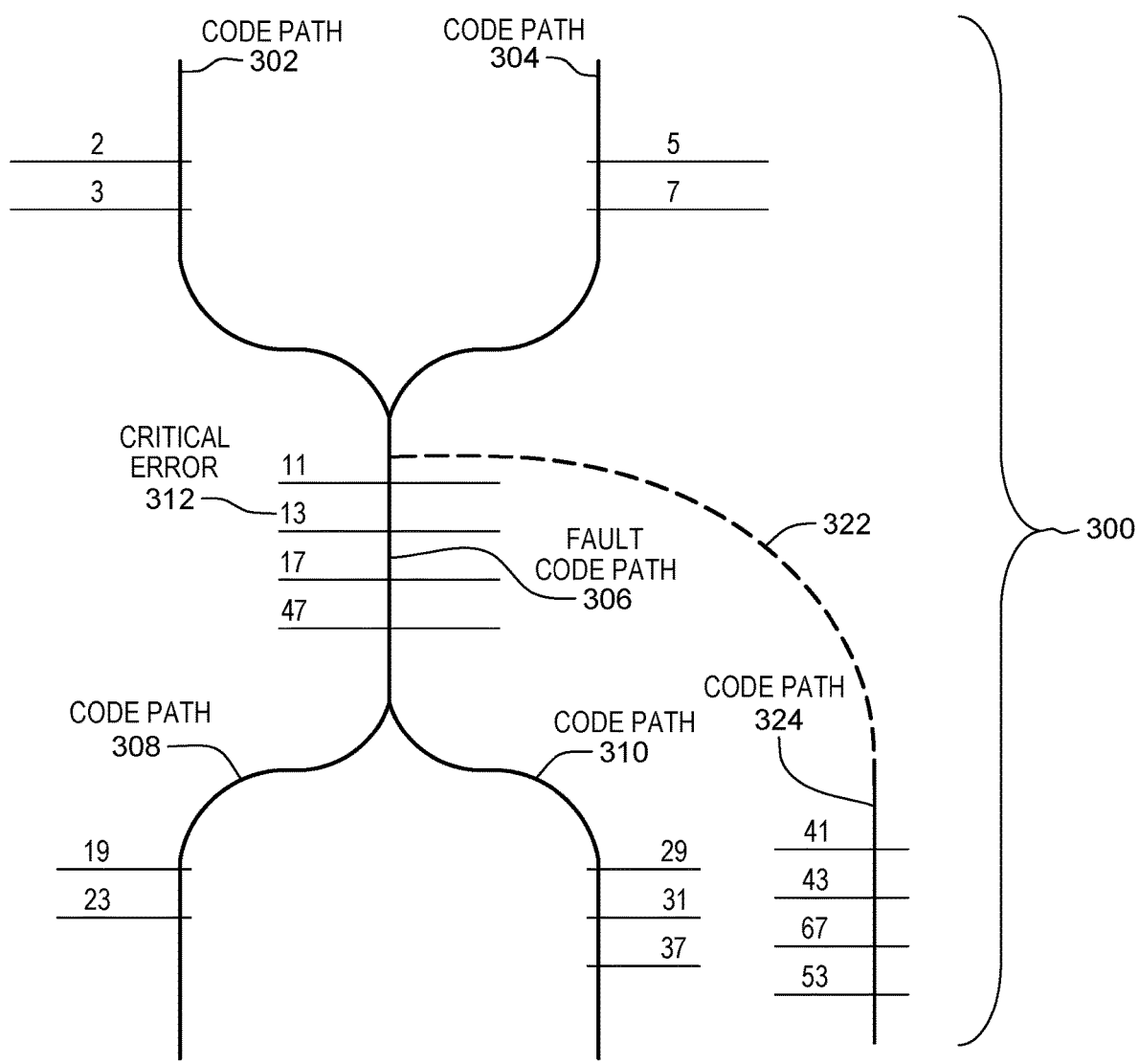
FIGS. 3A-3D depict examples of code paths taken during program execution in testing and production environments and automatic avoidance of fault code paths in accordance with one or more example embodiments of the invention.
Figure 3B:
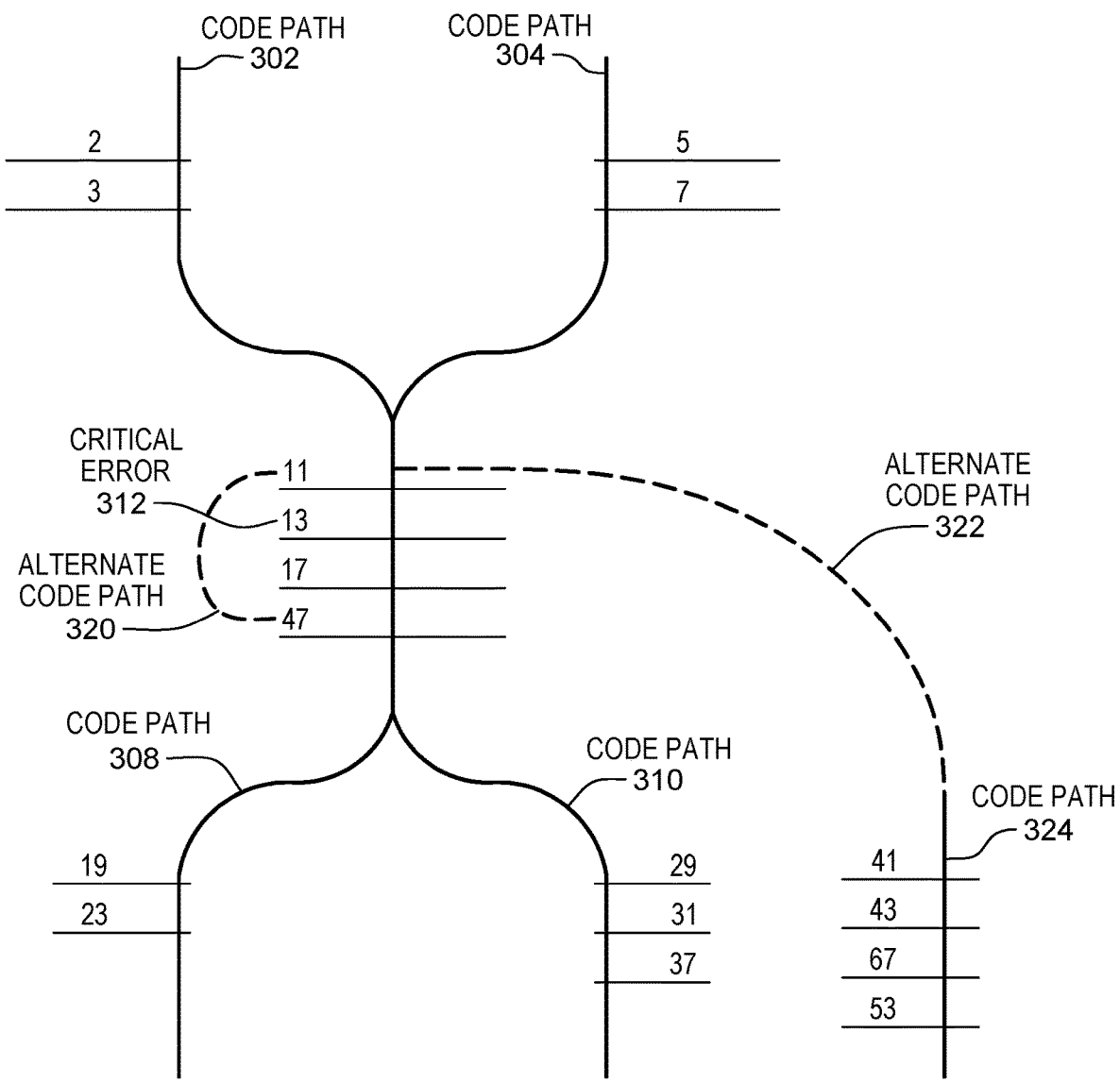
Figure 3C:
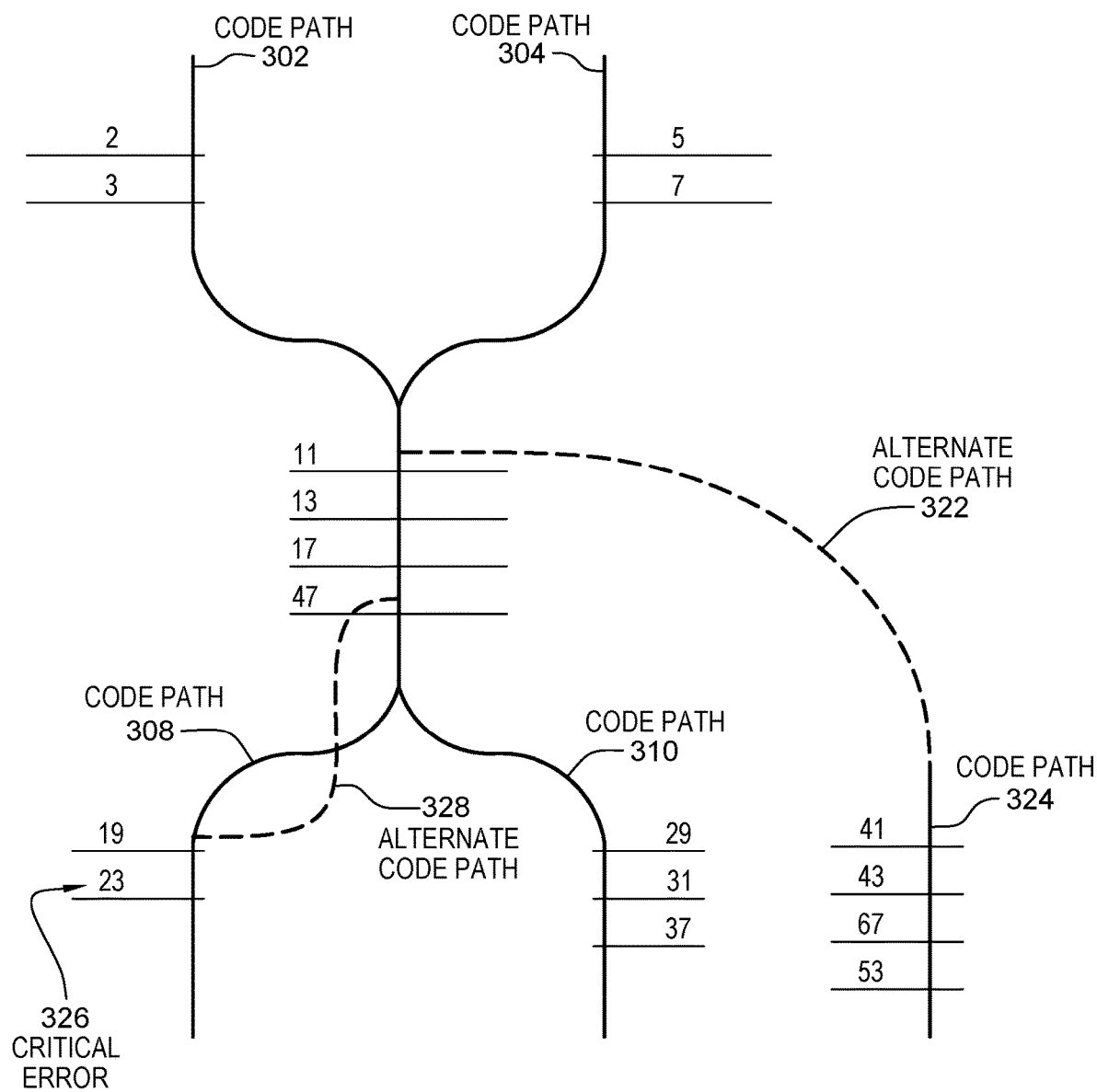
Figure 3D:
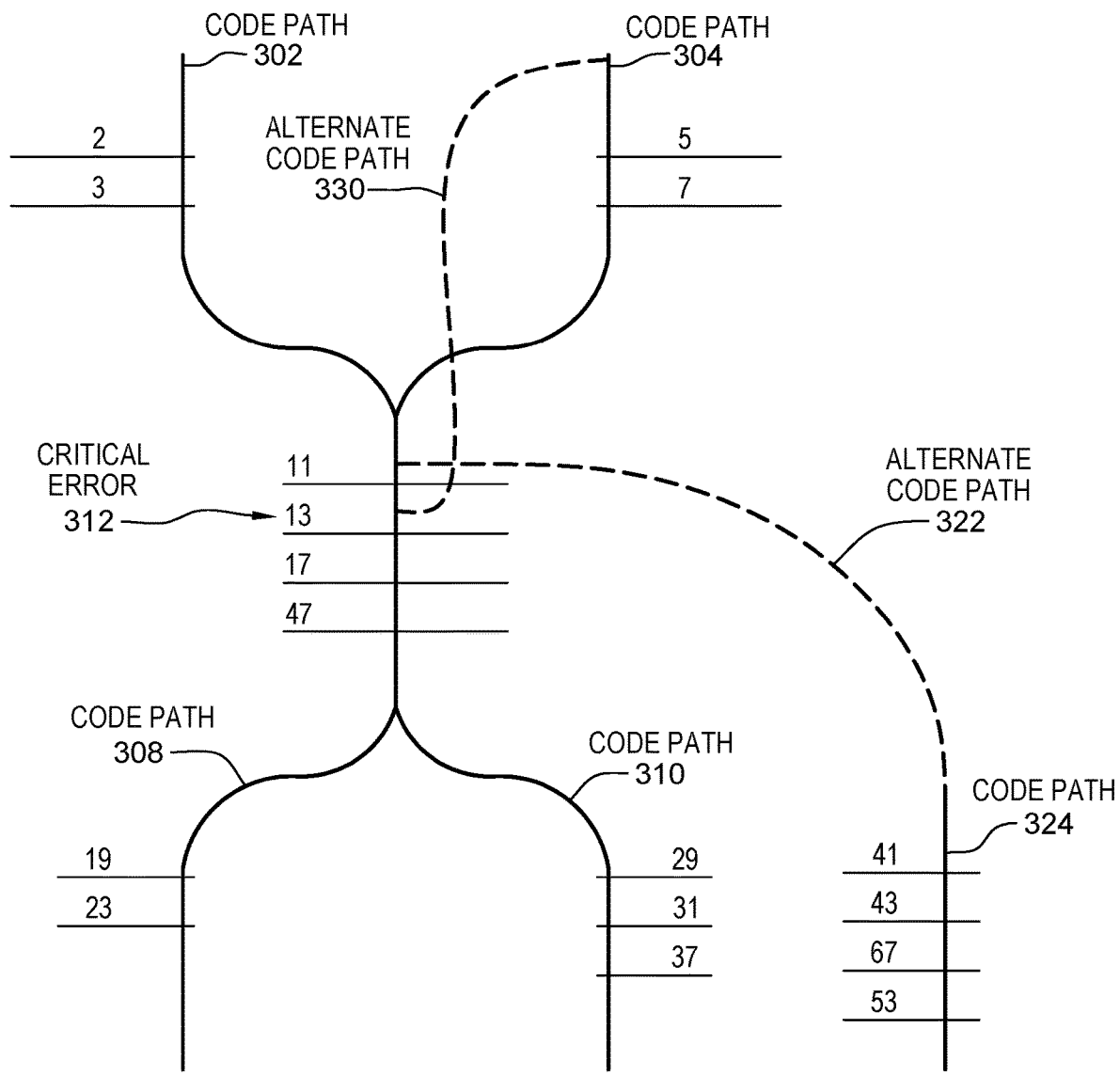

FIGS. 3A-3D depict examples of code paths taken during program execution in testing and production environments and automatic avoidance of fault code paths in accordance with one or more example embodiments of the invention. FIG. 3A depicts a collection of breakpoints 300 that are encountered during the execution of a regression test. If the execution monitor 118 detects any critical errors 312 (decision block 406, "Yes" branch shown in FIG. 4), the self-healing engine 120 identifies a fault code path associated with the detected critical error at block 408. In other words, if the critical error 312 occurred at the breakpoint having breakpoint value 13, the self-healing engine 120 identifies the code path containing that breakpoint as a fault code path. In the illustrated case, code path 306 is identified as a fault code path.

In example embodiments, when a fault code path is identified, the self-healing engine 120 may determine the last decision branch that was taken to drive the fault code path 306. For example, the self-healing engine 120 may identify a line of code associated with the breakpoint having breakpoint value 11 as an entering point of the fault code path 306. It should be noted that the fault code path can be reached by traversing either a first code path 302 or a second code path 304. The first code path 302 has the fingerprint <2,3>, while the second code path 304 has the fingerprint <5, 7>. In either case, the self-healing engine 120 may identify a minimal set of parameters whose values may be set to entirely avoid execution of the fault code path 306. It should be noted that the occurrence of the critical error 312 may bring the entire SUT down. According to embodiments of the present invention, once the self-healing engine 120 performs analysis described above, during subsequent executions of the source code segment illustrated in FIG. 3A, rather than entering the fault code path 306, the self-healing engine 120 dynamically avoids traversal of the fault code path 306. For example, once the code associated with the breakpoint having breakpoint value of 11 is reached instead of continuing with the execution of the fault code path 306, the self-healing engine 120 may jump to the execution of either third code path 308 or fourth code path 310. In this case, the third code path 308 has fingerprint <19, 23> and the fourth code path 310 has fingerprint <29, 31, 37>.

FIG. 3B depicts avoidance of a fault code path in a production environment for the same source code segment depicted in FIG. 3A and alternative means for identifying an alternative code path in accordance with one or more example embodiments of the invention. In particular, if the self-healing engine 120 observes the fingerprint <2,3> or the fingerprint <5,7> indicating traversal of the first code path 302 or the second code path 304, respectively, and the self-healing engine 120 encounters the breakpoint having assigned value 11, the self-healing engine 120 may dynamically select a first alternative path, such as code path 320, which may lead to traversal of either third code path 308 or fourth code path 310 depending on a corresponding breakpoint. In some embodiments, upon determining that a fault code path 310 is about to be entered based on encounter of the breakpoint having value of 11, the self-healing engine 120 may notify the user and may halt execution of the program to obtain user's instructions with respect to execution of the fault code path 306. In some embodiments, user's instructions may include instructions to execute a second alternative code path 322 instead of the fault code path 306 The second alternative code path 322 may lead to traversal of the fifth code path 324. Regardless of the severity of the critical error 312, the self-healing engine 120 enables the SUT to remain usable even if some data will be lost as a result of avoidance of the fault code path 306.

FIG. 3C depicts another example of avoidance of a fault code path. In this case, third code path 308 is a fault code path because a critical error 326 occurs at the breakpoint having assigned value 23. During next execution upon determining that the fault code path 308 is about to be entered based on encounter of the breakpoint having value of 19, the self-healing engine 120 may take a third alternative code path 328, which leads back to the breakpoint having value of 47 and the fourth code path 310 may be traversed instead of the fault code path 308 to avoid another occurrence of the critical error 326.

FIG. 3D depicts yet another example of avoidance of a fault code path. In this case, just like in FIG. 3A, the critical error 312 occurs at the breakpoint having assigned value 13. During next execution upon determining that the fault code path is about to be entered based on encounter of the breakpoint having value of 11, the self-healing engine 120 may determine how this particular breakpoint has been reached and take an alternative path based on that determination. For example, if the self-healing engine 120 determines that the breakpoint having value of 11 has been reached via the first code path 302, in response, it may take a fourth alternative code path 330, which leads to the second code path 304. In this case, the second code path 304 may be taken to determine whether the critical error 312 will still occur despite taking the second code path 304.

While only prime number-based fingerprint generation algorithm is shown in FIGS. 3A-3D, various embodiments of the present invention are not so limited. In example embodiments, other algorithms, such as, but not limited to a string-based algorithm, may be employed to generate unique fingerprints from which corresponding code paths taken can be uniquely reconstructed. In certain example embodiments, the prime number-based algorithm provides a fingerprint with even more granularity than the string-based algorithm. In particular, with the prime number-based algorithm, the number of times any given breakpoint is encountered and the order in which that breakpoint is encountered can be discerned simply from deconstructing (e.g., prime factoring) the corresponding indexed value in the fingerprint.

Figure 6:
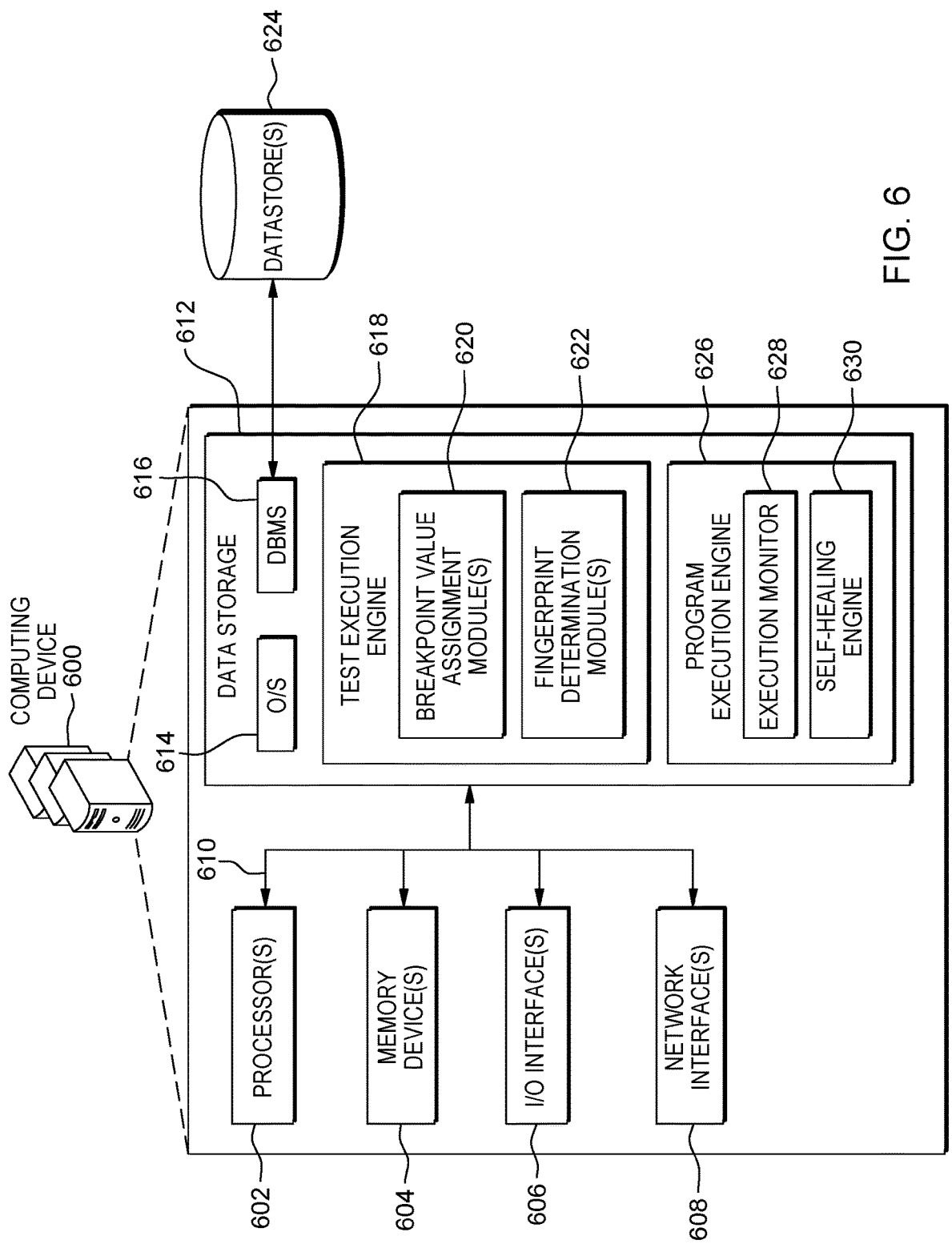
FIG. 6 is a schematic diagram of an illustrative computing device configured to implement one or more example embodiments of the invention.

FIG. 6 is a schematic diagram of an illustrative computing device 600 configured to implement one or more example embodiments of the invention. The illustrative computing device 600 may include a server or collection of servers; a personal computer; a handheld device; or the like. While the computing device 600 and/or any particular component of the computing device 600 may be described herein in the singular, it should be appreciated that multiple instances of the computing device 600 and/or any component thereof may be provided, and functionality described in connection with the computing device 600 may be distributed across multiple computing devices 600 and/or across multiple instances of any particular component of the computing device 600.

In an illustrative configuration, the computing device 600 may include one or more processors (processor(s)) 602, one or more memory devices 604 (generically referred to herein as memory 604), one or more input/output ("I/O") interfaces 606, one or more network interfaces 608, and data storage 612. The computing device 600 may further include one or more buses 610 that functionally couple various components of the computing device 600.

The bus(es) 610 may include at least one of a system bus, a memory bus, an address bus, or a message bus, and may permit the exchange of information (e.g., data (including computer-executable code), signaling, etc.) between various components of the computing device 600. The bus(es) 610 may include, without limitation, a memory bus or a memory controller, a peripheral bus, an accelerated graphics port, and so forth. The bus(es) 610 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random-access memory (SRAM), various types of dynamic random-access memory (DRAM), various types of unalterable ROM, and/or writable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 612 may include removable storage and/or non-removable storage including, but not limited to, magnetic storage, optical disk storage, and/or tape storage. The data storage 612 may provide non-volatile storage of computer-executable instructions and other data. The memory 604 and the data storage 612, removable and/or non-removable, are examples of computer-readable storage media (CRSM) as that term is used herein.

The data storage 612 may store computer-executable code, instructions, or the like that may be loadable into the memory 604 and executable by the processor(s) 602 to cause the processor(s) 602 to perform or initiate various operations. The data storage 612 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604 and may ultimately be copied to data storage 612 for non-volatile storage.

More specifically, the data storage 612 may store one or more operating systems (O/S) 614; one or more database management systems (DBMS) 616 configured to access the memory 604 and/or one or more external datastores 624; and one or more program modules, applications, engines, managers, computer-executable code, scripts, or the like such as, for example, a test execution engine 618 that may include one or more breakpoint value assignment modules 620 and one or more fingerprint determination modules 622 and a program execution engine 626 that may include one or more execution monitor modules 628 and one or more self-healing engine modules 630. Any of the components depicted as being stored in data storage 612 may include any combination of software, firmware, and/or hardware. The software and/or firmware may include computer-executable instructions (e.g., computer-executable program code) that may be loaded into the memory 604 for execution by one or more of the processor(s) 602 to perform any of the operations described earlier in connection with correspondingly named modules/engines depicted in FIG. 1.

Although not depicted in FIG. 6, the data storage 612 may further store various types of data utilized by components of the computing device 600 (e.g., data stored in the datastore(s) 624). Any data stored in the data storage 612 may be loaded into the memory 604 for use by the processor(s) 602 in executing computer-executable instructions. In addition, any data stored in the data storage 612 may potentially be stored in the external datastore(s) 624 and may be accessed via the DBMS 616 and loaded in the memory 604 for use by the processor(s) 602 in executing computer-executable instructions.

The processor(s) 602 may be configured to access the memory 604 and execute computer-executable instructions loaded therein. For example, the processor(s) 602 may be configured to execute computer-executable instructions of the various program modules, applications, engines, managers, or the like of the computing device 600 to cause or facilitate various operations to be performed in accordance with one or more embodiments of the invention. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 612, the O/S 614 may be loaded from the data storage 612 into the memory 604 and may provide an interface between other application software executing on the computing device 600 and hardware resources of the computing device 600. More specifically, the O/S 614 may include a set of computer-executable instructions for managing hardware resources of the computing device 600 and for providing common services to other application programs. In certain example embodiments, the O/S 614 may include or otherwise control the execution of one or more of the program modules, engines, managers, or the like depicted as being stored in the data storage 612. The O/S 614 may include any operating system now known or which may be developed in the future including, but not limited to, any server operating system, any mainframe operating system, or any other proprietary or non-proprietary operating system.

The DBMS 616 may be loaded into the memory 604 and may support functionality for accessing, retrieving, storing, and/or manipulating data stored in the memory 604, data stored in the data storage 612, and/or data stored in external datastore(s) 624. The DBMS 616 may use any of a variety of database models (e.g., relational model, object model, etc.) and may support any of a variety of query languages. The DBMS 616 may access data represented in one or more data schemas and stored in any suitable data repository. Data stored in the datastore(s) 624 may include, for example, breakpoint values; fingerprints; source code; regression tests; fault code paths; and so forth, any portion of which may alternatively or additionally be stored in the data storage 612. External datastore(s) 624 that may be accessible by the computing device 600 via the DBMS 616 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 600 may further include one or more network interfaces 608 via which the computing device 600 may communicate with any of a variety of other systems, platforms, networks, devices, and so forth. The network interface(s) 608 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 6 as being stored in the data storage 612 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 600 and/or other computing devices may be provided to support functionality provided by the modules depicted in FIG. 6 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 6 may be implemented, at least partially, in hardware and/or firmware across any number of devices.

It should further be appreciated that the computing device 600 may include alternate and/or additional hardware, software, or firmware components beyond those described or depicted without departing from the scope of the invention. More particularly, it should be appreciated that software, firmware, or hardware components depicted as forming part of the computing device 600 are merely illustrative and that some components may not be present or additional components may be provided in various embodiments. While various illustrative modules have been depicted and described as software modules stored in data storage 612, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 400 and/or the method 500 may be performed by one or more computing devices 600 having the illustrative configuration depicted in FIG. 6, or more specifically, by one or more program modules, engines, applications, or the like executable on such a device. It should be appreciated, however, that such operations may be implemented in connection with numerous other device configurations.

The operations described and depicted in the illustrative methods of FIGS. 4 and 5 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIGS. 4 and 5 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automatically avoiding fault paths in software code of a System Under Test (SUT), the method comprising:
   generating a plurality of fingerprints by executing a plurality of regression tests, wherein the plurality of regression tests is generated based on a functional coverage model of the SUT and wherein each of the plurality of fingerprints uniquely identifies a specific code path in the software code of the SUT, wherein the functional coverage model comprises a plurality of attributes, each of the plurality of attributes having a set of possible values and wherein the functional coverage model defines possible combinations of values of the attributes as covered by the plurality of regression tests;
   detecting a critical error during execution of the software code of the SUT;
   identifying a fault code path in the software code of the SUT associated with the critical error by analyzing the plurality of generated fingerprints;
   identifying at least one fingerprint associated with the identified fault code path in the software code of the SUT; and
   automatically preventing, during subsequent execution of the software code of the SUT, the identified fault code path in the software code of the SUT from being executed based on the identified at least one fingerprint, by identifying a minimum set of possible combinations of values of the attributes to prevent the identified fault code path from being executed.

2. The method of claim 1, further comprising selecting an alternative code path in the software code of the SUT instead of the identified fault code path based on the identified fingerprint during the subsequent execution of the software code of the SUT.

3. The method of claim 2, wherein selecting the alternative code path in the software code of the SUT instead of the identified fault code path further comprises selecting the alternative code path based on an analysis of results of the executed plurality of regression tests.

4. The method of claim 1, further comprising terminating the execution of the software code of the SUT, in response to the identifying the fault code path.

5. The method of claim 1, wherein automatically preventing, during subsequent execution of the software code of the SUT, the identified fault code path in the software code of the SUT from being executed further comprises identifying a segment of the software code of the SUT that leads to the identified fault code path.

6. A system for automatically avoiding fault paths in software code of a System Under Test (SUT), the system comprising:
   at least one processor; and
   at least one memory storing computer-executable instructions, wherein the at least one processor is configured to access the at least one memory and execute the computer-executable instructions to:
   generate a plurality of fingerprints by executing a plurality of regression tests, wherein the plurality of regression tests is generated based on a functional coverage model of the SUT and wherein each of the plurality of fingerprints uniquely identifies a specific code path in the software code of the SUT, wherein the functional coverage model comprises a plurality of attributes, each of the plurality of attributes having a set of possible values and wherein the functional coverage model defines possible combinations of values of the attributes as covered by the plurality of regression tests;
   detect a critical error during execution of the software code of the SUT;
   identify a fault code path in the software code of the SUT associated with the critical error by analyzing the plurality of generated fingerprints;
   identify at least one fingerprint associated with the identified fault code path in the software code of the SUT; and
   automatically prevent, during subsequent execution of the software code of the SUT, the identified fault code path in the software code of the SUT from being executed based on the identified at least one fingerprint, by identifying a minimum set of possible combinations of values of the attributes to prevent the identified fault code path from being executed.

7. The system of claim 6, wherein the instructions further comprise instructions to select an alternative code path in the software code of the SUT instead of the identified fault code path based on the identified fingerprint during the subsequent execution of the software code of the SUT.

8. The system of claim 7, wherein the instructions to select the alternative code path in the software code of the SUT instead of the identified fault code path further comprise instructions to select the alternative code path based on an analysis of results of the executed plurality of regression tests.

9. The system of claim 6, wherein the instructions further comprise instructions to terminate the execution of the software code of the SUT, in response to the identifying the fault code path.

10. The system of claim 6, wherein the instructions to automatically prevent, during subsequent execution of the software code of the SUT, the identified fault code path in the software code of the SUT from being executed further comprise instructions to identify a segment of the software code of the SUT that leads to the identified fault code path.

11. A computer program product for automatically avoiding fault paths in software code of a System Under Test (SUT), the computer program product comprising a computer readable storage medium having program instructions embodied therewith, the program instructions readable by a processing circuit to cause the processing circuit to perform a method comprising:

generating a plurality of fingerprints by executing a plurality of regression tests, wherein the plurality of regression tests is generated based on a functional coverage model of the SUT and wherein each of the plurality of fingerprints uniquely identifies a specific code path in the software code of the SUT, wherein the functional coverage model comprises a plurality of attributes, each of the plurality of attributes having a set of possible values and wherein the functional coverage model defines possible combinations of values of the attributes as covered by the plurality of regression tests;

detecting a critical error during execution of the software code of the SUT;

identifying a fault code path in the software code of the SUT associated with the critical error by analyzing the plurality of generated fingerprints;

identifying at least one fingerprint associated with the identified fault code path in the software code of the SUT; and automatically preventing, during subsequent execution of the software code of the SUT, the identified fault code path in the software code of the SUT from being executed based on the identified at least one fingerprint by identifying a minimum set of possible combinations of values of the attributes to prevent the identified fault code path from being executed.

12. The computer program product of claim 11, further comprising selecting an alternative code path in the software code of the SUT instead of the identified fault code path based on the identified fingerprint during the subsequent execution of the software code of the SUT.

13. The computer program product of claim 11, further comprising terminating the execution of the software code of the SUT, in response to the identifying the fault code path.

14. The computer program product of claim 11, wherein automatically preventing, during subsequent execution of the software code of the SUT, the identified fault code path in the software code of the SUT from being executed further comprises identifying a segment of the software code of the SUT that leads to the identified fault code path.

* * * * *